United States Patent [19]

Schrammek et al.

[11] Patent Number: 4,899,260
[45] Date of Patent: Feb. 6, 1990

[54] OPTICAL CONDUCTOR BODY FOR ILLUMINATING INDICATION ELEMENTS OF ELECTRICAL APPARATUSES

[75] Inventors: Manfred F. L. Schrammek, Wetzlar; Mathias Sprengart, Wetzlar-Nauborn, both of Fed. Rep. of Germany

[73] Assignee: U.S. Philips Corporation, New York, N.Y.

[21] Appl. No.: 266,176

[22] Filed: Nov. 2, 1988

[30] Foreign Application Priority Data

Nov. 5, 1987 [DE] Fed. Rep. of Germany ....... 3737514

[51] Int. Cl.$^4$ ................................................ F21V 7/04
[52] U.S. Cl. ..................................... 362/32; 362/300; 350/96.1; 340/815.31
[58] Field of Search .................. 362/23, 26, 29, 30, 362/32, 300; 116/287; 350/96.1; 340/815.17, 815.31

[56] References Cited

U.S. PATENT DOCUMENTS 4,124,879  11/1978  Schoemer ........................... 362/26
4,321,655   3/1982  Bouvrande ....................... 362/23 X
4,765,701   8/1988  Cheslak ............................. 362/26 X Primary Examiner—Stephen F. Husar
Attorney, Agent, or Firm—Bernard Tiegerman

[57] ABSTRACT

A body of a material as clear as glass, is arranged behind the parts to be illuminated and passes light beams from at least one illumination source to the areas to be illuminated and reflects the beams by deflection at reflection surfaces to the individual areas to be illuminated. The optical conductor body (1) includes a plate (1) with a substantially planar surface, openings (7, 8, 9) extending transversely through the plate (1), the walls (7a, 8a, 9a) of these openings extending at right angles to the central plane (5) of the plate at an acute angle to the course of the light beams and having reflection surfaces. The light beams are passed parallel to the central plane (5) of the plate within the plate, the light beams being reflected into recesses provided as output areas and being reflected out of these recesses by means of reflection surfaces (10b) inclined with repsect to the central plane (5) of the plate.

15 Claims, 4 Drawing Sheets

OPTICAL CONDUCTOR BODY FOR ILLUMINATING INDICATION ELEMENTS OF ELECTRICAL APPARATUSES

BACKGROUND OF THE INVENTION

The invention relates to an optical conductor body for illuminating indication elements of an electrical apparatus from the inside. A body of material as clear as glass, is arranged behind the parts to be illuminated and passes light from at least one illumination source by total reflection within the optical conductor body to the areas to be illuminated. The light is deflected at reflection surfaces to the individual areas to be illuminated.

Such optical conductor bodies are common practice in electrical apparatus, more particularly car radios, because light serving for illumination can be conducted from comparatively remote light sources to individual areas to be illuminated by means of these bodies. Such optical conductor bodies are generally of very complicated construction either due to the fact that individual optically conductive tracks are specifically formed or due to the fact that use is made of complex three dimensional surface structures.

Small electrical apparatuses, more particularly car radios, require a very compact construction comprising a minimum number of component parts. It is then advantageous if individual parts can be assigned as far as possible to several operating functions. Such functions are, for example, operating functions for guiding push buttons in the direction of depression.

SUMMARY OF THE INVENTION

The optical conductor body consists of a plate having a substantially planar surface.

Openings extend transversely through the plate, the walls of these openings extending at right angles to the central plane of the plate and at an acute angle to the course of the light beam, being constructed as reflection surfaces, by means of which the light beams are conducted further within the plate parallel to the central plane of the plate.

The light beams are passed to recesses and are reflected away from these recesses by means of reflection surfaces inclined with respect to the central plane of the plate.

Due to the construction in the form of a plate, the optical conductor body requires only a small constructional depth in the direction of the depth of the apparatus. All light beams remain in this plate and are first passed on each time at the walls of the openings and then remain in the plate. It is not until the light beams strike an inclined reflection surface at the region of a recess constructed as a output area that they are generally reflected out approximately perpendicularly from the plate and passed to the desired area to be illuminated. Due to this construction as a plate, the optical conductor can occupy a comparatively large surface area behind the apparatus front. The light beams can be emitted correspondingly far into peripheral regions and can be used there for illumination from behind.

According to a further embodiment of the invention, it is ensured that the reflection surfaces are parabolic especially at the openings. This construction permits obtaining the change in direction by simple prisms, and keeping the luminance of the emitted light beam constant over greater distances.

The transmission losses are thus minimized over longer paths.

According to a further embodiment of the invention, the plate can be constructed at the output areas so that the reflection surfaces are formed in the recesses by molding synthetic material. The light beams can thus be deflected by the inclined reflection surfaces with respect to their shape to an area to be illuminated even if operating elements with reflection surfaces at given area are not provided.

If the optical conductor plate has already been passed beneath the individual key buttons, rockers, levers or the like, according to a further embodiment of the invention, the recesses can be shaped so that the mutual refractive surfaces are provided in the rams of the operating members guided in the recesses. Such guides may then be dispensed with in other elements used hitherto comprising the guides.

The openings for deflecting the light beams within the plate may have the shape of triangles. Such triangles are formed in that two, for example parabolic, reflection surfaces coincide. The triangular shape is efficient with respect to the moulding technique.

DESCRIPTION OF THE PREFERRED EMBODIMENTS

Figure 1:
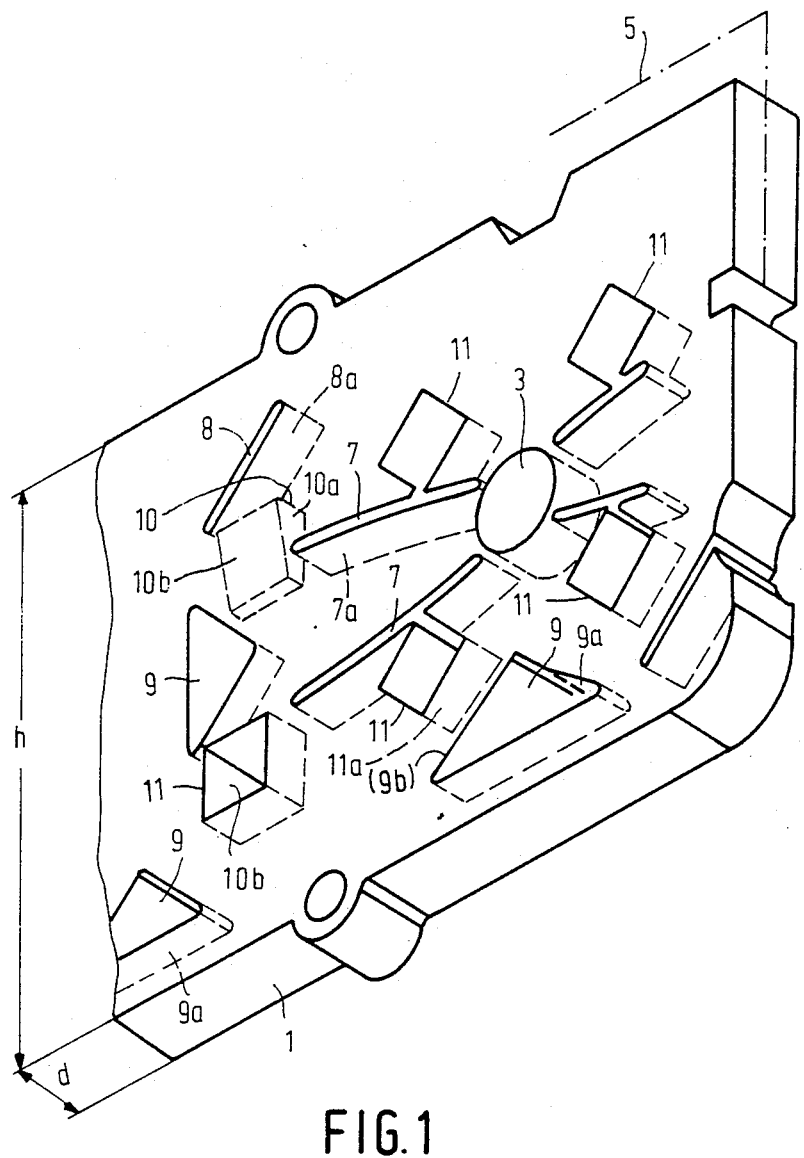
FIG. 1 is a perspective view of an optical conductor plate with the openings serving for the light reflection and extending at right angles to the central plane of the plate.

An optical conductor plate 1 shown in FIG. 1 consisting of a material as clear as glass having flat upper and lower sides is provided to be arranged behind the front panel of a car radio. Both the height h and the thickness d of the optical conductor plate are proportional so that the optical conductor body can be integrated in the front panel of a car radio.

Figure 2:
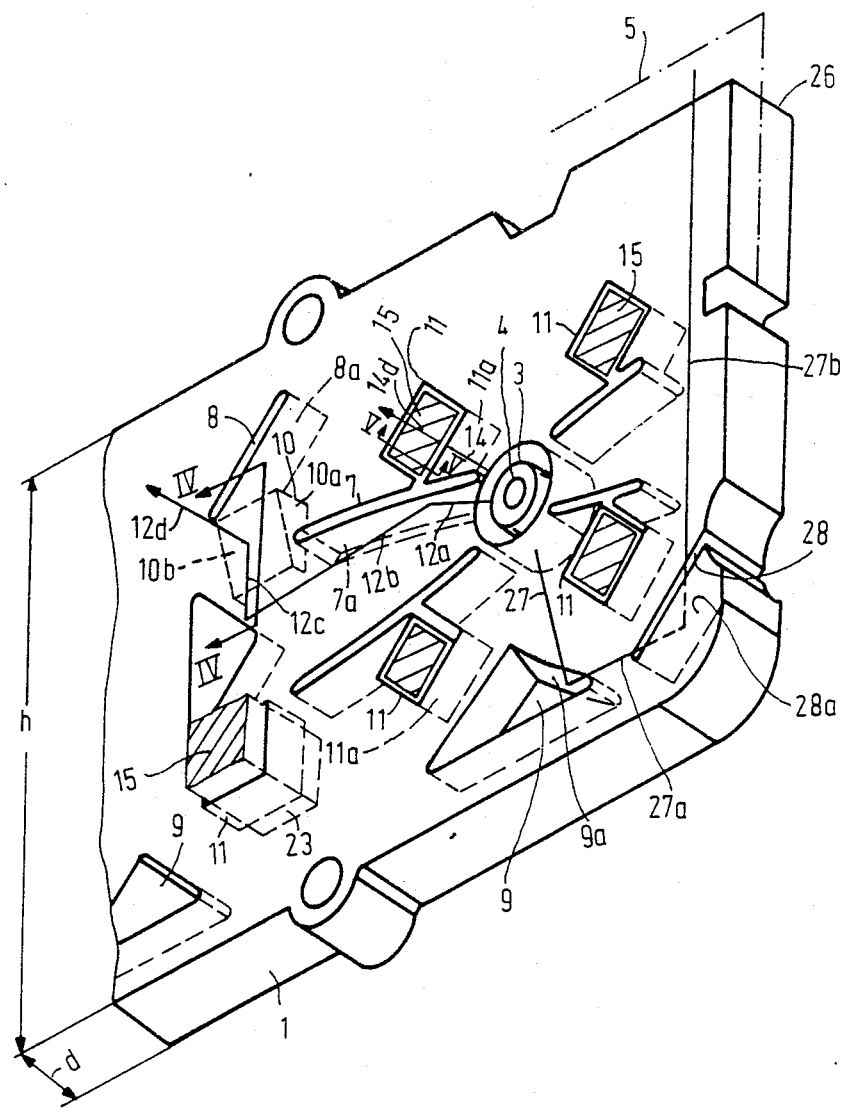
FIG. 2 shows the plate of FIG. 1 with an incandescent lamp inserted into a central opening and individual light beams originating therefrom and passing by reflection to elements to be illuminated from the inside.

The optical conductor plate 1 is provided with a central opening 3, into which, as shown in FIG. 2, an incandescent lamp 4 can be inserted. The plate 1 is provided at right angles to the central plane 5 of the plate with slots or triangular openings 7, 8, 9, whose, for example, parabolic walls 7a, 8a, 9a extend as reflection surfaces at right angles to the central plane 5 of the plate. The shaping of the openings 7, 8, 9 is arbitrary. It must only be ensured that the light beams are totally reflected at the reflection surfaces, i.e. the interfaces between plate material and air. Further preferably rectangular or square recesses 10, 11 are provided, by whose walls 10a, 11a the light beams are not reflected through oblique incidence, but pass into the recesses through perpendicular incidence. The recesses 10 are shaped so that in them surfaces 10b extending at an inclination with respect to the central plane 5 output the light passing through the surface 10a at right angles to parts of apparatuses, such as peripheral surfaces, subsurfaces or the like, to be illuminated (FIG. 4).

Rams 15 are guided in the recesses 11, into which the light is emitted through the walls 11a, by means of the walls 11a. The rams 15 guide on the front side of the apparatus operating elements 17, such as buttons, rockers or the like (FIG. 5).

FIG. 2 shows individual beam paths originating from the incandescent lamp 4 and passed to the recesses 10 and 11. If a light beam 12 chosen by way of example is considered, the latter is reflected as beam 12a at a wall surface 7a of the slot-shaped opening 7 and is then the beam part 12b. The wall surface 7a encloses, in order to render the reflection possible, an acute angle with the beam 12a. A wall 13a of an opening 13 reflects the beam part 12b during the further procedure as beam part 12c into the region 10b of the recess 10. An associated reflection surface 10b inclined with respect to the central plane 5 reflects the beam perpendicularly from the plate 1, which breaks out as beam part 12d. The direction of reflecting out is indicated by the arrow representation at the end of the beam part 12d. The inclination angle $\alpha$ of the reflection surface 10b is 45° to the central plane 5.

Figure 4:
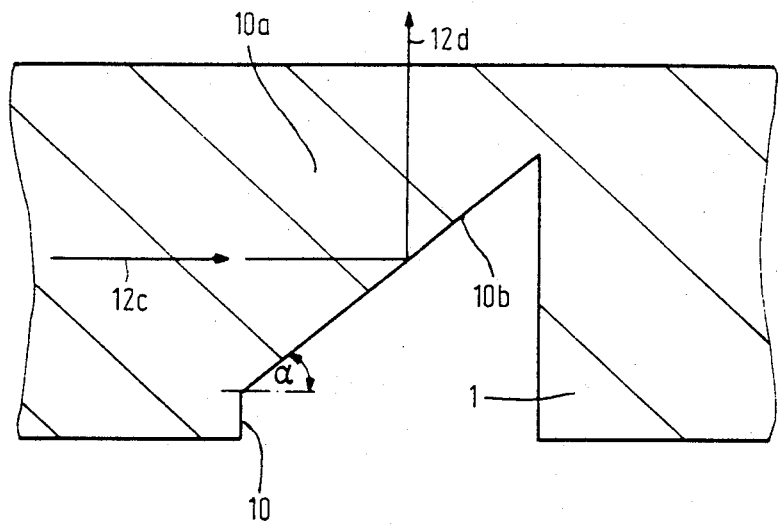
FIG. 4 shows on an enlarged scale a recess for key guidance and for diaphragming out light with an inclined reflection surface in sectional view.

FIG. 4 shows on an enlarged scale a sectional view of the recess 10 taken on IV—IV in FIG. 2. In the sectional view the position of the reflection surface 10b can be seen. When the light beam 12c reaches a region 10a of the recess 10 with the reflection surface 10b, the reflection surface reflects the light beam 12c as light beam 12d. This light beam 12d is coupled out from the plate 1 to a part to be illuminated.

Figure 5:
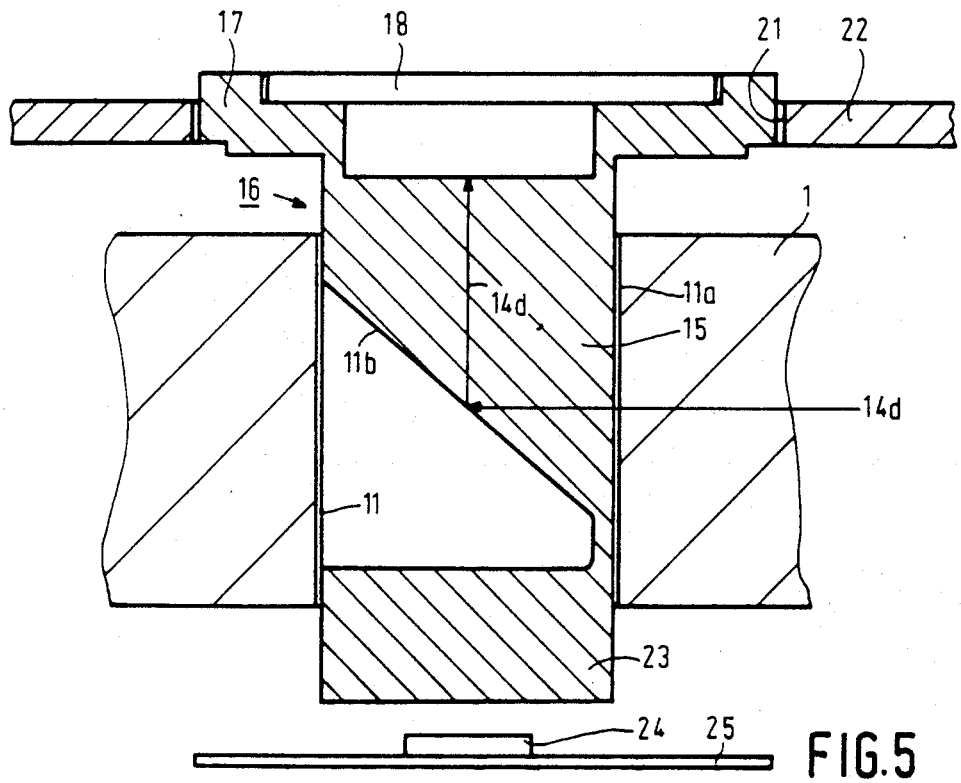
FIG. 5 shows on an enlarged scale a recess, in which a ram of an operating member is guided, with a reflection surface in the ram.

Another beam 14 chosen by way of example in FIG. 2 penetrates, for example, directly perpendicularly into a wall 11a of a recess 11 and can penetrate there at the same time directly into the ram 15 of a key 16 shown in FIG. 5 (FIG. 5). The beam 14 is coupled at a reflection surface 11b in the ram 15, which extends at an inclination with respect to the optical conductor plate 1, as beam part 14d upwards into the associated key button 17.

FIG. 5 shows the construction of the output means through the recess 11 and the ram 15 more clearly on an enlarged scale by means of a sectional view V—V of FIG. 2. The light beam 14 is conducted through a wall 11a of the recess 11, which it strikes perpendicularly, onto the inclined reflection surface 11b, which is formed in the ram 15. The light beam 14 is reflected at said surface and is passed as beam part 11d along the optically conducting ram 15 to the key button 17, in which a marking plate 18 to be illuminated is arranged. The button 17 is present, for example, in an opening 12 of a front 22 of a car radio. The foot 23 of the key can cooperate with a pressure switch 24 at a circuit plate 25, which is shown in a simplified form.

The recesses 11 are formed so that their walls 11a guide the rams 15 of the elements, which project from the front. The optical conductor plate itself is thus at the same time a guide plate for elements. Further guiding measures of different kind can thus be economized.

Figure 3:
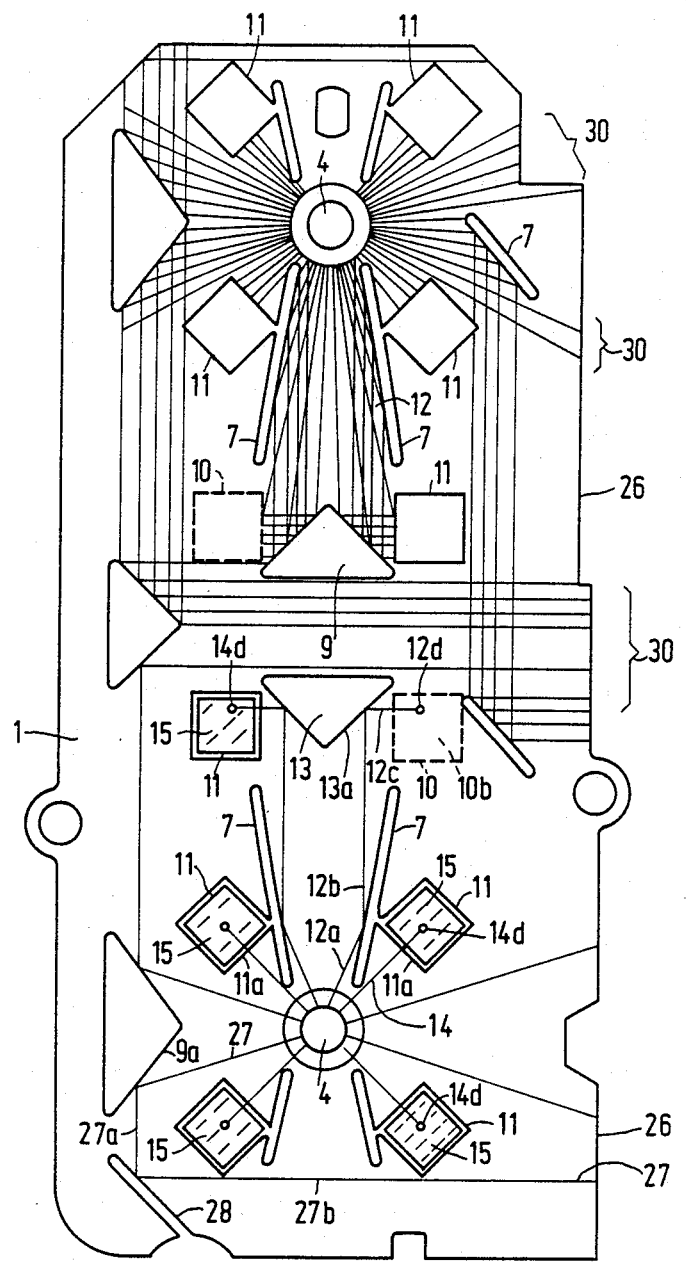
FIG. 3 is a plan view of the optical conductor plate, only a few light beams, as in FIG. 2, being shown in the lower half and the upper half showing more beams and illustrating concentrations more clearly.

As shown in FIGS. 2 and 3, a part of the light beams is output through the minor side surfaces 26. Such a light beam 27 is deflected, for example, at a wall 28a of a slot 28 as beam part 27b to the minor side surface 26.

The walls 9a and 28a enclose with the beam parts 27, 27a, 27b again acute angles.

Thus, it is possible to illuminate by directed coupling-out of light beams from the optical conductor body in all spatial directions decorative parts, such as, for example, light-emitting sections, illuminated cassette flaps or other operating elements, such as, for example, keys of a drive gear, without additional light sources being required and without the plate having a height profile.

What is claimed is:

1. An optical conductor body for illuminating indication elements of an electrical apparatus from the inside comprising:

a plate of optically transmissive material, having a substantially planar surface which plate is arranged behind element parts to be illuminated and through which light beams pass from at least one illumination source by total reflection within the plate to the areas to be illuminated and are conducted by deflection at reflection surfaces to the individual areas to be illuminated;

the optical conductor body (1) comprises a plate (1) with a substantially planar surface, openings (7,8,9) at least one opening extending transversely through the plate and having walls extending at right angles to a central plane (5) of the plate and at an acute angle to the course of the light beam for reflecting the light beams in a direction parallel to the central plane (5) of the plate within the plate; and at least one recess formed in the plate having a reflection surface (10b) inclined with respect to the central plane (5) of the plate for reflecting a light beam out of the plate in a direction away from the body.

2. An optical conductor body as claimed in claim 1, wherein the reflection surfaces of the opening comprise parabolic surfaces.

3. An optical conductor body as claimed in claim 1 comprising at least one operating element ram having inclined reflection surfaces slidably disposed in the plate.

4. An optical conductor body as claimed in claim 1, in which the plate with integrated reflection surfaces (10b) in the recesses comprises an injection-molded or cut synthetic material.

5. An optical conductor body as in claim 1 in which the opening comprises a slot for longitudinally conducting the light beams within the plate.

6. An optical conductor body as in claim 1 in which the comprises a triangle for deflecting the light beam within the plate.

7. An optical conductor body as in claim 3 the recesses (11) comprising a rectangular opening for guiding the ram (15) in the plate.

8. An optical conductor body as in claim 1 in which the reflection surface of said recess (10b, 11b) encloses an angle $\alpha$ of about 45° with the central plane (5) of the plate.

9. An optical conductor body for illuminating indication elements comprising:

a plate shaped body of light transmissive material having a first major planar surface and a central plane for conducting light beams from an illumination source to areas adjacent to said indication elements;

a plurality of openings extending transversely through said body and having walls disposed substantially at right angles to said central plane for reflecting light within said body in a direction substantially parallel to said central plane; and at least one recess in said body having a surface inclined with respect to said central plane for reflecting light out of said body to said indication element.

10. An optical conductor body as claimed in claim 9, wherein the reflection surfaces comprise parabolic surfaces.

11. An optical conductor body as claimed in claim 9 comprising at least one operating element ram having inclined reflection surfaces disposed for slidable motion in a direction substantially perpendicular to the central plane.

12. An optical conductor body as claimed in claim 9, comprising an injection-molded or cut synthetic material.

13. An optical conductor body as claimed in claim 9 in which the openings comprise slots for longitudinally conducting the light beams within the plate.

14. An optical conductor body as claimed in claim 9 in which the openings comprise triangles for deflecting the light beam within the plate.

15. An optical conductor body as claimed in claim 11 in comprising rectangular openings for guiding the rams in the plate.

* * * * *